Figure 1:
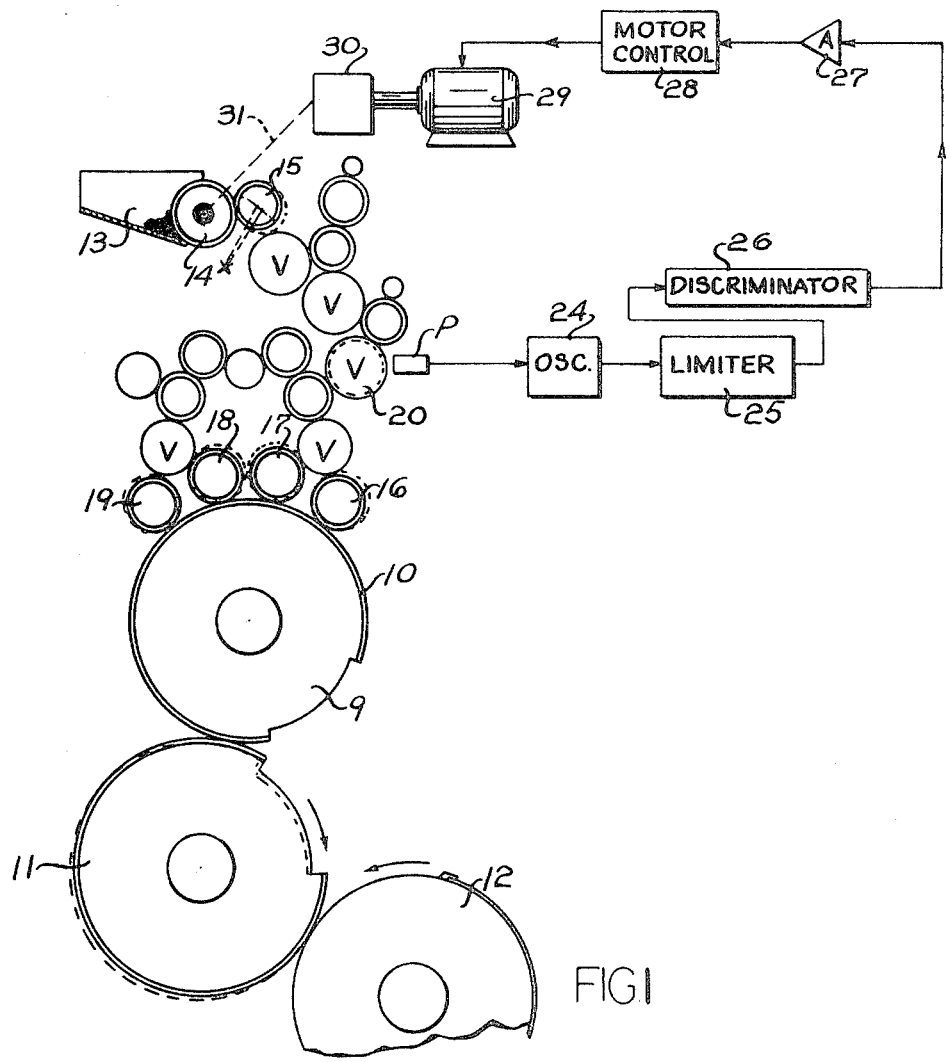

United States Patent

[11] 3,584,579

| | | |
|---|---|---|
| [72] | Inventor | Nathaniel Rothenberg<br>Valley Stream, N.Y. |
| [21] | Appl. No. | 780,798 |
| [22] | Filed | Dec. 3, 1968 |
| [45] | Patented | June 15, 1971 |
| [73] | Assignee | Harris-Intertype Corporation<br>Cleveland, Ohio |

[54] SENSING PROBE AND CONTROL FOR PRESS INKER EMBODYING SAME
13 Claims, 2 Drawing Figs.

[52] U.S. Cl. ................................................. 101/350,
324/61
[51] Int. Cl. ....................................... B41f 31/00,
G01r 27/26
[50] Field of Search ............................................ 101/335,
349, 350, 363, 147, 148, 207, 208; 324/59, 61;
118/7, 8; 73/150

[56] References Cited
UNITED STATES PATENTS

| 2,518,045 | 8/1950 | May | 324/61 TK |
|---|---|---|---|
| 2,707,916 | 5/1955 | Smith et al. | 101/363 |
| 2,971,461 | 2/1961 | Bradford et al. | 101/426 |
| 3,012,193 | 12/1961 | Breen | 324/61 |
| 3,059,466 | 10/1962 | Urmenyi | 324/61 TK |
| 3,077,858 | 2/1963 | Ulug | 324/61 TK |
| 3,227,951 | 1/1966 | Dykaar | 324/61 |

*Primary Examiner*—Robert E. Pulfrey
*Assistant Examiner*—J. Reed Fisher
*Attorney*—Yount, Flynn & Tarolli

ABSTRACT: Sensing probe for capacitively sensing the thickness of an ink film being transferred by a printing press inker. The probe has an inductive probe element which is insensitive to the ink film and which offsets changes in the probe's capacitive response due to machine vibrations, so that the overall response of the probe is substantially insensitive to such vibrations. The probe is part of a control for automatically regulating the rate at which ink is being transferred by the inker.

PATENTED JUN 15 1971 3,584,579

INVENTOR.
NATHANIEL ROTHENBERG
BY
Young, Flynn & Tarolli
ATTORNEYS

SENSING PROBE AND CONTROL FOR PRESS INKER EMBODYING SAME

This invention relates to a sensing probe for capacitively sensing the thickness of a material being transferred and to a control for an inker which applies a film of ink onto the surface of a lithographic plate on a cylinder of a lithographic printing press.

Printing units commonly are equipped with inkers for applying ink to a printing plate in the press at a selected rate, such as to achieve the proper ink-water balance in a lithographic printing press, for example. One aspect of the present invention is directed to improving the operation of such inkers by sensing the thickness of the ink film in the inker by means of a novel probe whose response is substantially insensitive to press vibrations. Preferably, the probe's response controls a regulator circuit to control automatically the speed of a pan roller in the inker, thereby regulating the rate at which the ink is being applied by the inker to the press. Another aspect of the present invention is directed to the novel probe itself, which is adapted for sensing a wide variety of materials being transferred under conditions where machine vibrations may affect the spacing between the probe and the material being transferred.

Accordingly, it is an important object of the present invention to provide a novel and improved sensing probe having provision for capacitively sensing a material being transferred and having an inductive probe element for offsetting the probe's capacitive response to changes in the spacing between the probe and the material.

Another object of this invention is to provide a novel and improved control for an inker on a printing press which includes a novel sensing probe that is substantially insensitive to machine vibrations.

Another object of this invention is to provide a novel and improved inker control having a novel sensing probe for sensing the thickness of the ink film being transferred by the inker, the probe having both inductive and capacitive probe elements which together substantially nullify the effects of machine vibrations on the probe's response.

Another object of this invention is to provide a novel and improved inker control which, in response to the sensing of the thickness of the ink film in the inker, automatically regulates the rate at which ink is transferred by the inker.

Figure 2:
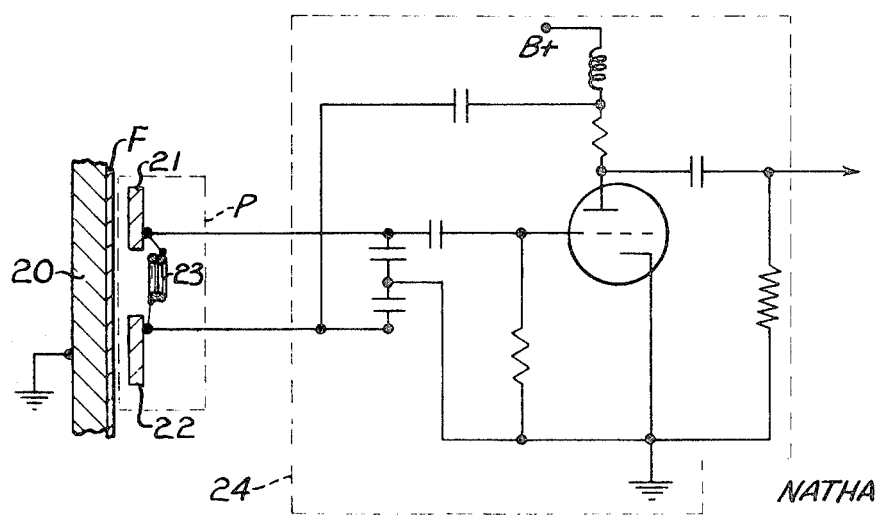

Further objects and advantages of the present invention will be apparent from the following detailed description of a presently-preferred embodiment thereof which is made with reference to the accompanying drawing forming a part of the specification and in which:

FIG. 1 is a schematic elevational view showing a lithographic press unit having an inker and having a sensing probe in accordance with the present invention for controlling the operation of the inker in accordance with the ink film thickness sensed by the probe; and FIG. 2 is a schematic circuit diagram showing the sensing probe connected in the tank circuit of an oscillator to control the latter's oscillation frequency.

Referring to FIG. 1, the printing unit of a lithographic press has a plate cylinder 9 carrying a lithographic plate 10, which is clamped to the plate cylinder by any suitable plate clamp arrangement (not shown). The printing unit also has the usual blanket cylinder 11 and impression cylinder 12.

Associated with this printing unit is an inker including an ink fountain 13, a fountain roller 14, an oscillating ductor roller 15, ink form rollers 16, 17, 18 and 19 and a train of rollers intermediate the ductor roller 15 and the ink form rollers 16—19. The train of rollers includes a bridge of rollers connecting the first pair 16 and 17 of the form rollers with the second pair 18 and 19. The rollers in the train connecting the ink fountain with the bridge contact the bridge at a point closer to the first pair 16 and 17 of form rollers than to the second pair 18 and 19, to supply the heavier charge of ink to the first pair as described in U.S. Pat. No. 2,448,975 of Harrold et al. The ink form rollers 16—19 and those other rollers in the ink train which are similarly illustrated in the drawings are customarily made of some ink receptive resilient rubber or composition material. The fountain roller 14 and vibrator rollers "V" of the ink train are conventionally metallic and each has a surface which is preferably of steel or steel plated with copper or other ink receptive material. The vibrator rollers "V" reciprocate in an axial direction in the usual manner to provide a lateral smoothening action of the ink as it travels down the ink train toward the plate.

Also associated with the printing unit is a dampener (not shown) for transferring a suitable ink-repellent liquid, such as water or a mixture of water and alcohol, from a reservoir to the press.

In accordance with one aspect of the present invention, the rate at which ink is applied to the plate 10 may be controlled by sensing the thickness of the ink film in the inker, as a measure of the rate at which ink is being applied to the press, and using this information to regulate the operation of the inker. In this manner the rate at which ink is applied to the press may be regulated so as to maintain the desired ink-water balance. For example, as shown in FIG. 1, the ink film thickness on the vibrator roller 20 is sensed by a probe P which is rigidly supported from the frame of the press in any suitable manner permitting the user to selectively adjust the spacing of the probe from the roller 20. Roller 20 comprises metal, such as steel, having good electrical conductivity and also adapted to conduct magnetic flux readily. Roller 20 constitutes a backing member for the ink film whose thickness is to be sensed, as described hereinafter.

Referring to FIG. 2, as illustrated schematically there, the probe P has both capacitive and inductive probe elements, including a pair of capacitive electrodes 21 and 22 and an inductance coil 23. The capacitive electrodes 21 and 22 are metal plates which are positioned in closely spaced, confronting relationship to the surface of the roller 20, being spaced from the ink film F on the latter by a small airgap. Each capacitive electrode 21 and 22 is one plate of a capacitor, and the opposite plate of each capacitor is the grounded metal roller 20. The dielectric of each capacitor consists of the ink film F on the roller 20 and the air gap between the ink film F and the respective probe electrode 21 or 22.

The coil 23 is also positioned in closely spaced, confronting relationship to the ink film F on the roller 20. One end of coil 23 is connected directly to the capacitive electrode 21 and the opposite end of coil 23 is connected directly to the other capacitive electrode 22 of the probe.

With this arrangement, the capacitive probe electrodes 21, 22, the grounded roller 20, and the probe coil 23 provide the L-C tank circuit for a Colpitts-type oscillator, the remainder of which is shown enclosed by the dashed-line box 24 in FIG. 2. Since the operation of Colpitts oscillators is well known, a detailed description of the operation of this oscillator is considered to be unnecessary. The L-C tank circuit provided by the present probe controls the frequency of operation of the oscillator in a known manner.

In the operation of this probe, the impedance (both resistive and inductive) of the coil 23 is substantially unaffected by the dielectric between it and the roller 20. That is, neither the apparent resistance nor the inductive reactance of the coil 23 will change as a result of the absence of an ink film F or as a result of an excessively thick or excessively thin ink film F on the roller. However, both the apparent resistance and the inductive reactance of the coil 23 will vary with the spacing between this coil and the roller 20. The closer this spacing, the lower will be the coil impedance. Consequently, it will be evident that machine vibrations which are imparted to either or both the probe coil 23 and the roller 20, and which will change the spacing between them, will change the coil impedance.

Such vibrations will also change the spacing between the capacitive electrodes 21 and 22 of the probe and the roller 20. The capacitive impedance of each capacitor, which consists of the respective probe electrode 21 or 22, the grounded roller 20, and the dielectric between the roller and the respective probe electrode 21 or 22, will vary with changes in the spacing between the capacitor plates 21 and 20, or 22 and 20, because this spacing determines the "thickness" of the air gap which is part of the dielectric of this capacitor. The closer this spacing the smaller will be this capacitive reactance.

By appropriate adjustment of the position of the probe coil 23 with respect to the capacitive electrodes 21 and 22 and the position of the capacitive electrodes with respect to the roller 20 in the absence of machine vibrations, the overall impedance of the L-C circuit provided by the probe and the roller 20 can be made substantially constant over a range of different spacings between the probe and the roller 20 such as might be caused by the vibrations normally produced by a printing press, for example. Over this entire range, the rate of change of the capacitive reactance is substantially equal and opposite to the rate of change of the inductive impedance, so that the net impedance of the probe L-C circuit remains substantially unaffected by positional changes between the probe P and the roller 20, such as might be caused by machine vibrations.

At the same time the capacitive reactance provided by each probe electrode 21 or 22 and the roller 20 will be dependent upon the composition of the dielectric between the capacitive probe electrode 21 or 22 and the roller 20. That is, this capacitive reactance will depend upon how much of the space between the capacitive probe electrodes 21, 22 and the roller 20 is occupied by the ink film and how much is occupied by air. Accordingly, the thicker the ink film F on the roller 20, the smaller will be the capacitive reactance of each of these capacitors in the tank circuit of the oscillator.

From the foregoing it will be evident that the capacitive electrodes 21 and 22 in the present probe cooperate with the roller 20 to provide capacitive reactances in the tank circuit of the oscillator which vary with the thickness of the ink film F on this roller. At the same time, changes in this capacitive reactance which are caused by machine vibrations are offset by corresponding changes in the impedance of coil 23 in the same tank circuit, so that the overall response of the probe is insensitive to such vibrations.

In one practical embodiment of the present invention, with a normal oscillator frequency of 26 megacycles per second (in the absence of an ink film on the roller 20) and a normal spacing between the probe and the roller 20 of 0.040 inch, the frequency shift of the oscillator per mil (0.001 inch) of thickness of the ink film is about 43 kc. per mil. This frequency shift is practically linear, so that the oscillator frequency is an accurate measure of the ink film thickness. Changes in the spacing between the probe and the roller 20 within the range of plus or minus 2½ mils from the normal 40 mil spacing (i.e., the range from 0.0375 inch to 0.0425 inch spacing between the probe and the roller) produce only a slight frequency shift of the oscillator, so that the error due to machine vibrations within this range would be negligible, as a practical matter.

In the embodiment of FIG. 1, the output signal of the oscillator is applied to an amplitude limiter 25, and the output from this limiter is applied to a discriminator 26. The discriminator produces an output signal whose amplitude is proportional to the frequency of the oscillator 24. The output signal from the discriminator is applied through an amplifier 27 to a motor control 28 which controls the energization of an electric motor 29. Motor 29 drives a gear reduction 30 which drives the fountain roller 14 of the inker through a suitable drive coupling 31, which may be a V-belt drive or a sprocket-and-chain drive.

With this arrangement, the speed at which the fountain roller 14 is driven is controlled in accordance with the response of the probe P. Whenever the probe P senses that the ink film thickness on roller 20 is such that an excessive amount of ink would be applied to the press, the probe response changes the frequency of oscillator 24 to cause the speed of motor 29 to be reduced automatically, thereby reducing the rate at which ink is being transferred by the inker. Conversely, if the probe P senses that the ink film thickness on roller 20 is such that an inadequate amount of ink would be applied to the press, the probe response changes the frequency of oscillator 24 to cause an increase in the speed of motor 29, thereby increasing the rate at which ink is being transferred by the inker.

From the foregoing it will be evident that the present control arrangement enables the automatic regulation of the ink-water balance in response to the capacitive sensing by the probe of the film thickness of the ink being transferred by the inker, the probe itself being substantially insensitive to press vibrations by virtue of the mutually offsetting changes in its capacitive and inductive impedance, as described.

While a presently-preferred embodiment of this control has been described in detail with reference to the accompanying drawing, it is to be understood that various modifications, adaptations and omissions which depart from the disclosed embodiment may be adopted without departing from the scope of the invention. For example, the present control may be used in an inker differing from the particular inker shown in FIG. 1 for purposes of illustration, such as an inker as disclosed in U.S. Pat. No. 2,971,461 to Bradford et al. in which the ink rate depends upon the stroke of an intermittently-rotated roller. Also, the control circuit may differ from the particular arrangement shown for detecting the probe's response. Also, the prob's response may be used to operate a meter or other visual or audible signalling device in place of, or in addition to, the feedback circuit shown for automatically regulating the operation of the inker.

Also, while the present capacitive-inductive probe has been disclosed in conjunction with a control for an inker, it is to be understood that this probe may be used in various other environments to sense the thickness of a material being transferred. For example, the present probe may be used to sense the ink film thickness on the printing plate of an offset press, a letterpress, or other printing apparatus. Also, the present probe may be used to detect the thickness or depth of various materials other than ink.

Having described my invention, I claim:

1. A sensing probe for capacitively sensing a material overlying an electrically conductive backing member, said probe comprising capacitive electrode means and coil means connected electrically to provide an L-C circuit, said capacitive electrode means coacting with the material on said backing member to vary the capacitive reactance of said L-C circuit in accordance with the dielectric properties of said material and the air gap between the probe and said material and in accordance with the spacing between the probe and said backing member, and said coil means having an impedance which is substantially unaffected by the dielectric properties of said material on the backing member and which varies with changes in the spacing between the probe and said backing member inversely with the variation of said capacitive reactance caused by such spacing changes.

2. In combination with an electrically conductive backing member for a material to be sensed, a sensing probe in spaced, confronting relationship to said backing member, said sensing probe comprising capacitive electrode means for capacitively sensing said material, and coil means connected electrically to said capacitive electrode means to provide an L-C circuit, said capacitive electrode means having a capacitance which is dependent upon said material and which varies to vary the capacitive reactance of said L-C circuit with changes in spacing between said probe and said backing member, said coil means having an impedance which is substantially unaffected by said material but which varies with changes in the spacing between the probe and said backing member inversely with the variation of the capacitive reactance of said L-C circuit caused by such spacing changes.

3. The combination of claim 2, and further comprising an oscillator having said capacitive electrode means and said coil means connected to control its oscillation frequency, and means for detecting the oscillation frequency of said oscillator as a measure of the thickness of the material sensed capacitively by said capacitive electrode means in the probe.

4. In combination with an inker for a printing press having rollers for transferring a film of ink to the press, a sensing probe having capacitive probe means for sensing the thickness of the ink film on one of said rollers and whose capacitance reactance varies with the thickness of said ink film and changes in the spacing between said probe and said roller, and means responsive to vibration between said probe and roller and whose impedance varies inversely with said capacitive reactance changes but is substantially insensitive to said ink film for substantially offsetting capacitive reactance changes caused by changes in the spacing between said probe and said roller.

5. The combination of claim 4, and further comprising means for driving said rollers, and means for regulating the speed at which said rollers are driven in accordance with the response of said probe to the thickness of said ink film on said one roller.

6. In combination with an inker for printing press having rollers for transferring a film of ink to the press, one of said rollers being of electrically conductive material, a sensing probe having capacitive electrode means spaced from said one roller by an air gap and in confronting relationship to said ink film thereon and together with said one roller providing opposite plates of capacitor means whose capacitive reactance varies with the thickness of said ink film on said one roller and varies with the spacing between said capacitive electrode means and said one roller, said probe also having coil means in spaced, confronting relationship to said one roller and whose impedance is substantially unaffected by said ink film on said one roller but does vary with changes in the spacing between said coil means and said one roller inversely with the changes in the capacitive reactance of said capacitor means caused by such spacing changes.

7. The combination of claim 6, wherein said capacitor means and said coil means are connected electrically to provide an L-C circuit, and further comprising means for responding to impedance changes in said L-C circuit as a measure of the thickness of said ink film on said one roller.

8. The combination of claim 7, wherein said last-mentioned means comprises an oscillator whose oscillation frequency is controlled by said L-C circuit, and means for producing a control signal whose magnitude is determined by said oscillation frequency.

9. The combination of claim 6, and further comprising drive means for driving said inker, and means for regulating the speed of said drive means in accordance with the response of said probe to the thickness of said ink film on said one roller.

10. A system for sensing the thickness of moving material comprising an electrode, an electrically conductive member spaced from said electrode and between which the moving material is operable to be located, said electrode and said electrically conductive member cooperating to form disposed capacitor whose capacitance is responsive to the moving material disposed said electrode and said electrically conductive material and to the relative spacing between said electrode and said electrically conductive member, thickness sensing means responsive to the capacitance of said capacitor and compensation means responsive to vibration induced spacing changes between the electrode and the conductive member for compensating for the variation of the capacitance between the electrode and the conductive member caused by vibration.

11. In a system as defined in claim 10 wherein said compensating means provides a compensating reactance.

12. In a system as defined in claim 11 wherein said compensating means provides a compensating inductive reactance.

13. In a system as defined in claim 12 further comprising a means for selectively adjusting the spacing between the electrode and said means for providing the inductive reactance, said compensating means comprising a coil.

UNITED STATES PATENT OFFICE
CERTIFICATE OF CORRECTION

Patent No. 3,584,579      Dated June 15, 1971

Inventor(s) Nathaniel Rothenberg

It is certified that error appears in the above-identified patent and that said Letters Patent are hereby corrected as shown below:

Column 6, line 20, after "disposed" insert --between--.

Signed and sealed this 30th day of November 1971.

(SEAL)
Attest:

EDWARD M. FLETCHER, JR.      ROBERT GOTTSCHALK
Attesting Officer      Acting Commissioner of Patents